(12) United States Patent
Gottfried

(10) Patent No.: US 8,584,552 B2
(45) Date of Patent: Nov. 19, 2013

(54) HIGH SPEED CONICAL FLYWHEEL SYSTEM

(76) Inventor: Mario H. Gottfried, Mexico (MX)

( * ) Notice: Subject to any disclaimer, the term of this patent is extended or adjusted under 35 U.S.C. 154(b) by 0 days.

(21) Appl. No.: 13/365,689

(22) Filed: Feb. 3, 2012

(65) Prior Publication Data

US 2013/0152728 A1    Jun. 20, 2013

Related U.S. Application Data

(60) Provisional application No. 61/445,691, filed on Feb. 23, 2011.

(51) Int. Cl.
*H02K 7/02* (2006.01)

(52) U.S. Cl.
USPC ..................... 74/572.11; 74/572.21

(58) Field of Classification Search
USPC ........ 74/572.1, 572.11, 572.12, 572.2, 573.1, 74/573.11, 573.12, 574.3, 572.21; 310/74
See application file for complete search history.

(56) References Cited

U.S. PATENT DOCUMENTS

| | | | |
|---|---|---|---|
| 3,960,034 A | 6/1976 | Hintergraber | |
| 4,186,245 A | 1/1980 | Gilman | |
| 4,207,778 A | 6/1980 | Hatch | |
| 4,498,015 A | 2/1985 | Gottfried | |
| 5,012,694 A | 5/1991 | McGrath | |
| 5,566,588 A | 10/1996 | Bakholdin et al. | |
| 6,014,911 A | 1/2000 | Swett | |
| 6,232,671 B1 | 5/2001 | Gottfried | |
| 6,247,382 B1 | 6/2001 | Umeki et al. | |
| 2002/0072457 A1* | 6/2002 | Bschorr et al. | 492/3 |
| 2003/0029269 A1* | 2/2003 | Gabrys | 74/572 |
| 2010/0307286 A1* | 12/2010 | Huang | 74/572.21 |

* cited by examiner

*Primary Examiner* — Richard W Ridley
*Assistant Examiner* — Richard V Wu
(74) *Attorney, Agent, or Firm* — Egbert Law Offices, PLLC

(57) ABSTRACT

A flywheel apparatus has a motor, a drive shaft connected to the motor, an upper conical section affixed to the drive shaft, and a lower conical section affixed to the drive shaft opposite said upper conical section. The upper conical section and lower conical section each have a plurality of layers, including a hollow core positioned adjacent the drive shaft, and alternating layers of tempered rings and non-tempered rings arranged outwardly of the hollow core. The alternating layers of tempered rings and non-tempered rings are joined with a elastomeric adhesive. The plurality of layers further include a hollow cavity positioned outwardly of the alternating layers, and a rim positioned outwardly of said hollow cavity. The hollow cavity can be filled with a fluid such as water, mercury-based fluids, oil-based fluids, or mixtures thereof.

14 Claims, 2 Drawing Sheets

HIGH SPEED CONICAL FLYWHEEL SYSTEM

CROSS-REFERENCE TO RELATED U.S. APPLICATIONS

The present application claims priority from U.S. Provisional Application Ser. No. 61/445,691, filed on Feb. 23, 2011, presently pending.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to field of flywheel systems. More particularly, the present invention the relates to high speed flywheel systems. Even more particularly, the present invention relates to flywheel systems utilizing conical configurations.

2. Description of Related Art Including Information Disclosed Under 37 CFR 1.97 and 37 CFR 1.98

A flywheel is a mechanical device with significant moment of inertia used as a storage device for rotational energy. The flywheel has been used since ancient times, the most common traditional example being the potter's wheel. In the Industrial Revolution, James Watt contributed to the development of the flywheel in the steam engine, and his contemporary James Pickard used a flywheel combined with a crank to transform reciprocating into rotary motion. In a more modern application, a momentum wheel is a type of flywheel useful in satellite pointing operations, in which the flywheels are used to point the satellite's instruments in the correct directions without the use of thruster rockets.

Flywheels resists changes in their rotational speed, which helps steady the rotation of the shaft when a fluxuating torque is exerted on it by its power source such as a piston based engine, or when the load placed on it is intermittent. Flywheels can be used to produce very high power pulses as needed for some experiments, where drawing the power from the public network would produce unacceptable spikes. A small motor can accelerate the flywheel between the pulses. Recently, flywheels have become the subject of extensive research as power storage devices for use in vehicles.

In application of flywheels in vehicles, the phenomenon of precession has to be considered. A rotating flywheel responds to any momentum that tends to change the direction of its axis of rotation by a resulting precession rotation. A vehicle with a vertical-axis flywheel would experience a lateral momentum when passing the top of a hill or the bottom of a valley (roll momentum in response to a pitch change). Two counter-rotating flywheels may be needed to eliminate this effect.

The amount of stored rotational energy or flywheel capacity increases with the square of angular velocity according to the physical principles of kinetics. However, as a practical matter, the maximum angular velocity is limited by strength of materials considerations in order to preserve the structural integrity of the flywheel rotor. Further, efficiency considerations are important in evaluating a particular rotor. Efficiency of energy storage flywheels is expressed in terms of energy density and volumetric efficiency. As efficiency increases, rotor space and mass requirements decrease for a given quantity of stored energy. Both the maximum allowable angular velocity and the efficiency are directly related to the specific strength of the primary load bearing material of the rotor.

Various patents have issued in the past relating to flywheel technology. For example, U.S. Pat. No. 4,498,015, issued on Feb. 5, 1985 to the present inventor, describes a flywheel device for a moving vehicle. The device comprises three flywheels mounted mutually perpendicular on shafts in three dimensions within a rigid enclosure. The shafts are interconnected within the enclosure through a bevel gear arrangement in which the motion of one flywheel is imparted to the other flywheels. The shafts pass through the walls of the enclosure through a bearing arrangement.

U.S. Pat. No. 6,232,671, issued on May 15, 2001 also to the present inventor, teaches a flywheel energy storage apparatus with braking capability. The apparatus is for a vehicle having a housing resiliently mounted in the vehicle. There are three pairs of flywheels each rotatable about separate axes within the housing. An energy input mechanism is connected to at least one of the flywheels for initiating and maintaining rotational movement of the flywheels. There is an output mechanism for converting the rotation of the flywheels into potential energy. Each of the flywheels of the first, second and third pairs are rotatable in opposite directions. Each of the axes are perpendicular to each other. A cradle is connected to the vehicle so as to receive the housing within the cradle. This flywheel system is designed to be safe, yet portable, as an electro-mechanical battery.

U.S. Pat. No. 3,960,034, issued on Jun. 1, 1976 to Hintergraber, describes a flywheel with an anti-cracking safeguard for protection against overspeed. The flywheel includes a frustroconical shaft portion, a flywheel mounted in press-fitting engagement on the shaft portion. The shaft portion has a force applied thereto directed toward the end of the frustroconical shaft portion having the smaller diameter. A catching and centering device for the flywheel is located adjacent the flywheel.

U.S. Pat. No. 6,014,911, issued on Jan. 18, 2000 to Swett, teaches a flywheel with a self-expanding hub. The flywheel has a rotor and annular disk which are of a composite material. A metal hub is secured to a shaft and joined to the disk at a hoop. The hub has opposite sections which are of a generally double conical shaft. A concentric rim extends around each hub section and upon rotation the hub sections expansivity deform about the rim to apply a compressive force to the disk to maintain a substantially stress free condition at the rotor and disk interface.

U.S. Pat. No. 5,566,588, issued on Oct. 22, 1996 to Bakholdin et al., describes a flywheel rotor with a conical hub. The flywheel rotor is used in a flywheel energy storage system and provides a high energy storage capacity while providing an ample volume for a high power motor-generator within its envelope. The flywheel rotor includes an outer, primarily cylindrical body having conically tapered end sections, a conical hub section attached to the outer body, and a relatively short inner cylinder. The cylinder connects the shaft to the inner portion of the conical hub section. The individual components are predominantly constructed of filament wound fiber composites. Material choices may be driven by both cost and performance. The inner portion of the inner cylinder can be a slotted aluminum cylinder.

U.S. Pat. No. 4,844,224, issued on Jul. 4, 1989 to Fukushima, teaches a flywheel assembly. The flywheel assembly has a first flywheel and a second flywheel. The first flywheel has a supporting plate and a slidable friction plate attached to and slidable with respect to the supporting plate. There is a damping mechanism for damping vibrations resulting from the spring force and a friction damping mechanism for damping vibration resulting from the friction force and operating on clutch engagement and disengagement. A disc-shaped diaphragm spring is provided for preventing vibration of the second flywheel by connecting the damper plate of the friction damper mechanism to the friction plate which slides away from the clutch at the time of clutch disengagement.

Various patents have issued in the past concerning flywheels having multiple layered compositions. U.S. Pat. No. 4,207,778, issued on Jun. 17, 1980 to Hatch, describes an reinforced composite flywheel. The cross-ply composite flywheel has a rim portion of circumferentially wound fibers impregnated with a binder. The density-to-stiffness ratio of the rim portion is of a value substantially less than the density-to-stiffness ratio of the cross-ply central portion of the flywheel. The strength of the flywheel is enhanced and only a minimum contribution is made to the weight of the flywheel.

U.S. Pat. No. 6,247,382, issued on Jun. 19, 2001 to Dumeki et al., teaches a composite material flywheel device. The flywheel structure has a ring made from a composite material of carbon fiber reinforced plastics and a spoke member inserted in the ring. The spoke member is made from the fiber reinforced plastics having a lower modulus of elasticity than that of the ring. A tapered bush is press-fitted into a center portion of the spoke member. Both of the tapered bush and the spoke member are tightly fixed on a shaft by a first spring supported by a holder, and by a second spring urging the holder so as to effectively prevent vibrations due to looseness thereof.

U.S. Pat. No. 4,186,245, issued on Jan. 29, 1980 to Gilman, describes an energy storage flywheel. The flywheel is constructed from glassy metal alloy strips having a high specific strength comparable to anisotropic fibers used in high energy density flywheels. The glassy metal alloy strips are formed into circular layers, and a plurality of layers are joined concentrically to build up the flywheel. Joining between strips and layers is accomplished with bonding means such that a substantially mechanically monolithic composite structure results. This provides a bonding shear strength at least about equal to the specific strength times the density divided by the aspect ratio of the glassy metal alloy strips.

Various patents have also issued in the past relating to high speed flywheels. For example, U.S. Pat. No. 5,012,694, issued on May 7, 1991 to McGraph, describes such a flywheel. The flywheel utilizes two or more ring-like components arranged in a spaced concentric relationship for rotation about an axis, and an expansion device interposed between the components for accommodating radial growth of the components resulting from flywheel operation. The expansion device engages both of the ring-like components, and the structure of the expansion device ensures that it maintains its engagement with the components. In addition to its expansion-accommodating capacity, the expansion device also maintains flywheel stiffness during flywheel operation.

It is an object of the present invention to provide a flywheel system which uses a very high rotating speed in a safe manner.

It is another object of the present invention to provide a flywheel system with increased storage capacity.

It is yet another object of the present invention to provide a high speed flywheel system having a reduced mass.

It is yet another object of the present invention to provide a flywheel system that is reduced in size.

It is a further object of the present invention to provide a high speed flywheel system that enables microvibration absorption.

It is another object of the present invention to provide a high speed flywheel system with reduced vibration.

These and other objects and advantages of the present invention will become apparent from a reading of the attached specification and appended claims.

BRIEF SUMMARY OF THE INVENTION

The present invention is a flywheel apparatus having a motor, a drive shaft connected to the motor, an upper conical section affixed to the drive shaft, and a lower conical section affixed to the drive shaft opposite the upper conical section. The upper conical section and lower conical section each have a plurality of layers. The plurality of layers includes a hollow core positioned adjacent the drive shaft, and alternating layers of tempered rings and non-tempered rings arranged outwardly of the hollow core. The alternating layers of tempered rings and non-tempered rings may be joined with a elastomeric adhesive. The plurality of layers may further include a hollow cavity positioned outwardly of the alternating layers, and a rim positioned outwardly of said hollow cavity. In the preferred embodiment of the present invention, the rim is formed of a carbon fiber composite material.

In the preferred embodiment of the present invention the plurality of layers of each of the upper and lower conical sections include a hollow core positioned adjacent the drive shaft, a rigid ring positioned outwardly of the hollow core, a first tempered ring positioned outwardly of the rigid ring, a first non-tempered ring positioned outwardly of the first tempered ring, a second tempered ring positioned outwardly of the first non-tempered ring, a second non-tempered ring positioned outwardly of the second tempered ring, a third tempered ring positioned outwardly of the second non-tempered ring, a hollow cavity positioned outwardly of the third tempered ring, and a carbon fiber composite rim positioned outwardly of the hollow cavity. The hollow cavity may be filled with a fluid such as water, mercury-based fluids, oil-based fluids, and mixtures thereof. Alternatively, the cavity can be filled with many materials that act as a fluid, such as powders and metallic or non-metallic substances or compounds.

In the present invention, the motor may be a brushless DC motor having permanent magnet rotors.

The present invention is also a flywheel apparatus having a motor, a drive shaft connected to the motor, and upper and lower conical sections affixed to the drive shaft. The upper and lower conical sections include a hollow core positioned adjacent the drive shaft, and alternating layers of tempered rings and non-tempered rings arranged outwardly of the hollow core. The alternating layers of tempered rings and non-tempered rings of the upper and lower conical sections may be joined with an elastomeric adhesive. The upper and lower conical sections may further include a hollow cavity positioned outwardly of the alternating layers of tempered rings and non-tempered rings, and a rim positioned outwardly of said hollow cavity.

The present invention is also a flywheel having a hollow core, a first conical section extending outwardly of a first side of the hollow core, and a second conical section extending outwardly of a second side of the hollow core. Each of the conical sections having alternating layers of tempered rings and non-tempered rings arranged outwardly of the hollow core, wherein an elastomeric adhesive is used to join said alternating layers. Further, a hollow cavity is positioned outwardly of the alternating layers of tempered rings and non-tempered rings. A rim may be positioned outwardly of the hollow cavity.

The foregoing Summary of the Invention is intended to be descriptive of the particular form of the present invention identified herein. It is understood that variations on this particular form of the present invention can be made. This Summary of the Invention should not be interpreted, in any way, as limiting of the scope of the present invention. The scope of the present invention is defined by the attached claims and their legal equivalence.

DETAILED DESCRIPTION OF THE INVENTION

There are four basic considerations when designing a flywheel system to operate at very high speeds. First, a motor must be chosen to drive the flywheel to high speeds. Second, the flywheel material must be of a sufficient strength to handle the high speeds. Third, the system must be balanced with extreme precision and have sufficient vibration damping. Finally, the flywheel must be designed to resist the distortion occurring due to very high centrifugal forces.

Figure 1:
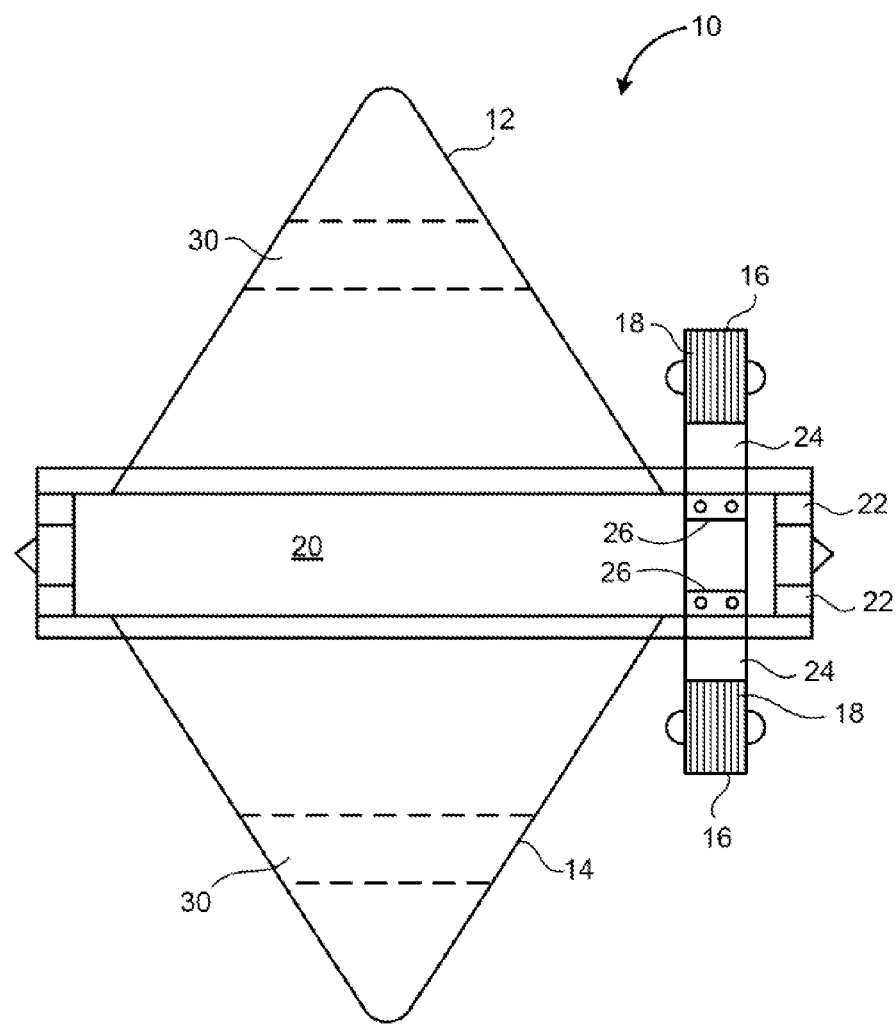
FIG. 1 is plan view, partially transparent, of the high-speed double-cone flywheel system of the present invention.

Referring to FIG. 1, there is shown a flywheel apparatus 10 of the present invention. The flywheel apparatus 10 of the present invention includes an upper conical section 12, a lower conical section 14, and a brushless DC motor 16. The upper conical section 12 and the lower conical section 14 form the double-cone flywheel of the present invention. The brushless DC motor 16 drives the drive shaft 20. The drive shaft 20 is connected to the upper conical section 12 and the lower conical section 14.

The motor 16 is a brushless DC motor having windings on the stator 18. The rotors of the brushless DC motor 16 have magnets 24. The magnets 24 are affixed to the drive shaft 20 with pins 26 on the rear to the magnets 24. Bearing supports 22 are also shown on the drive shaft 20. When the motor 16 is activated, the magnets 24 of the rotor cooperate with the stator 18 to turn the drive shaft 20. In turn, the drive shaft 20 turns the upper conical section 12 and the lower conical section 14. There may be two or four magnets 24 on the rotor of the brushless DC motor 16. The magnets 24 are strong permanent magnets. Permanent magnet motor technology has become more cost-effective recently with the rise in the price of copper used in stator and rotor windings, along with a decrease in the price of permanent magnet materials.

Figure 2:
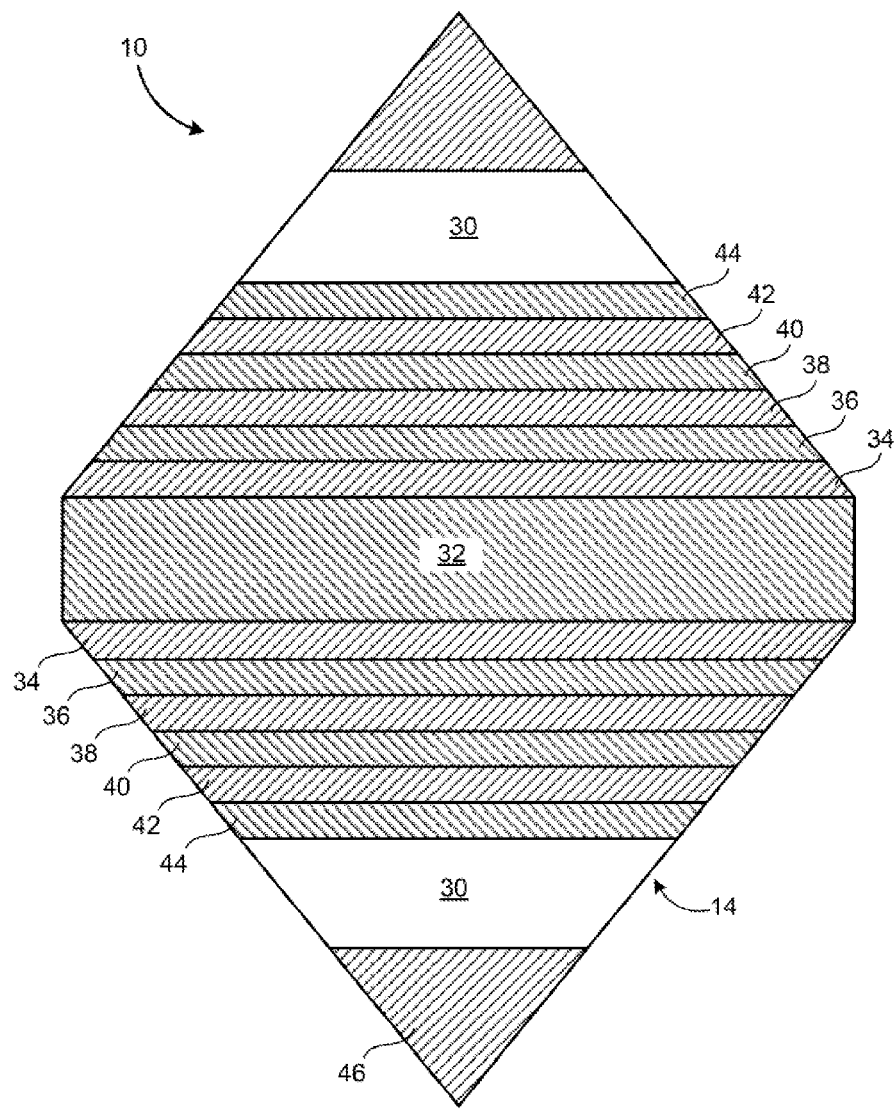
FIG. 2 is a cross sectional view of the various layers of the high-speed double-cone flywheel of the present invention.

Referring to FIG. 2, there is shown a cross-sectional view of the flywheel apparatus 10 of the present invention, showing the various layers of the upper conical section 12 and the lower conical section 14. The upper conical section 12 and the lower conical section 14 are essentially identical, with corresponding layers on each of the upper conical section 12 and the lower conical section 14. Beginning at the center of FIG. 2, there is shown the hollow core 32. Moving outwardly in each directions of the hollow core 32, there is shown a steel or composite rim 34 affixed over the hollow core 32. The steel or composite rim 34 is rigid. A first tempered ring 36 is affixed over the steel or composite rim 34. Tempering is done to effectively toughen the metal by transforming brittle martensite into bainite or a combination of ferrite and cementite. Tempering is accomplished by a controlled reheating of the work piece to a temperature below its lower critical temperature.

A first non-tempered ring 38, is affixed over the first tempered ring 36. A second tempered ring 40, is affixed over the first non-tempered ring 38. A second non-tempered ring 42, is affixed over the second tempered ring 40. A third tempered ring 44 is affixed over the second non-tempered ring 42. Moving outwardly of the third tempered ring 44, there is shown the hollow cavity 30 of the present invention. The hollow core may be filled with a fluid, which may be oil based, water based or mercury based. Alternatively, the cavity can be filled with many materials that act as a fluid, such as powders and metallic or non-metallic substances or compounds. Outwardly of the cavity 30 there is shown the strong carbon fiber composite rim 46.

Vibration amplitude is the main limiting factor in a high-speed flywheel system, as precise balancing does not eliminate all high frequency vibrations and rotor harmonics that may be amplified at high speeds. The high strength tempered rings are affixed against the softer non-tempered rings in order to aid in high-speed vibration dampening. Each of the layers are affixed together using a latex-like glue. The rings, both tempered and non-tempered, may be alloy metals or combination of composites, where the types of resin fibers, and baking versus slow-curing considerations may change performance characteristics. Greater harmonic damping and microvibration absorption may be better achieved, by softening the higher speed amplitude, and allowing faster speeds up to rated strength, at long-term use without fatigue.

The cavity 30 may be filled with fluid or other material, thus allowing fluid to find its own level in extreme centrifugal force. The soft mass of the fluid in the cavity 30 will absorb and dampen the increases of magnitude of vibration generated by the unbalance and harmonic variations. The cavity 30 is an enclosed ring of very high strength. It is postulated that this cavity can be filled with any fluid to dampen the vibrations, such as mercury, oil or water-based fluids. Further, it may prove advantageous to utilize fluid material combinations to optimize balancing, and to balance out mass at very high speeds.

Referring back to FIG. 1, the magnets 24 may be affixed in a variety of ways so as to dampen the vibration associated with high speeds of rotation. Due to the centrifugal force of rotation, the weight of the magnets increases many times, making it difficult for the flywheel to stay steady. The present invention employs the technique of cutting a slot on the pipe shaft and slipping a magnet 24 in the slot to a ledge. Two holes on the magnet 24 are lined up the inside wall of the drive shaft 20 where two curved pins are inserted and secured by riveting. In an alternative embodiment of the present invention the same result may be achieved by cutting a slot on the magnets 24 for a U section to be pressed into it to secure it in place.

Using the flywheel of the present invention, speeds above 100,000 rpm can be achieved. This will allow greater storage capacity over the prior art. Even though the present design may reduce mass and size of the flywheel, the higher speed renders a greater energy storage capacity. The present invention has a approximately three-quarters of the weight of the traditional flywheel of the prior art.

The advantages of the present invention pertain to greater energy storage capacity at less mas and size. This enables the present invention to better serve the function of a battery, as well as to reduce the size of the apparatus. The reduced size enables the apparatus to fit better in smaller places and enables a wider variety of uses.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A flywheel apparatus comprising:
   a motor;
   a drive shaft connected to said motor;
   an upper conical section affixed to said drive shaft; and
   a lower conical section affixed to said drive shaft opposite said upper conical section, said upper conical section and said lower conical section each having a plurality of layers, said plurality of layers comprising:
      a hollow core positioned adjacent said drive shaft; and
      alternating layers of tempered rings and non-tempered rings arranged outwardly of said hollow core.

2. The flywheel apparatus of claim 1, wherein said alternating layers of tempered rings and non-tempered rings are joined with a elastomeric adhesive.

3. The flywheel apparatus of claim 1, said plurality of layers further comprising:
   a hollow cavity positioned outwardly of said alternating layers; and
   a rim positioned outwardly of said hollow cavity.

4. The flywheel apparatus of claim 3, said rim being formed of a carbon fiber composite material.

5. The flywheel apparatus of claim 1, said alternating layers of said tempered rings and non-tempered rings comprising:
   a hollow core positioned adjacent said drive shaft;
   a rigid ring positioned outwardly of said hollow core;
   a first tempered ring positioned outwardly of said rigid ring;
   a first non-tempered ring positioned outwardly of said first tempered ring;
   a second tempered ring positioned outwardly of said first non-tempered ring;
   a second non-tempered ring positioned outwardly of said second tempered ring; a third tempered ring positioned outwardly of said second non-tempered ring;
   a hollow cavity positioned outwardly of said third tempered ring; and
   a carbon fiber composite rim positioned outwardly of said hollow cavity.

6. The flywheel apparatus of claim 5, said hollow cavity being filled with a fluid.

7. The flywheel apparatus of claim 6, said fluid being selected from a group consisting of water, mercury-based fluids, oil-based fluids, and mixtures thereof.

8. A flywheel apparatus comprising:
   a motor;
   a drive shaft connected to said motor;
   an upper conical section affixed to said drive shaft, said upper conical section comprising:
      a hollow core positioned adjacent said drive shaft; and
      alternating layers of tempered rings and non-tempered rings arranged outwardly of said hollow core; and
   a lower conical section affixed to said drive shaft opposite said upper conical section, said lower conical section comprising:
      a hollow core positioned adjacent said drive shaft; and
      alternating layers of tempered rings and non-tempered rings arranged outwardly of said hollow core.

9. The flywheel apparatus of claim 8, wherein said alternating layers of tempered rings and non-tempered rings of said upper conical section and said lower conical section are joined with an elastomeric adhesive.

10. The flywheel apparatus of claim 8, said upper conical section and said lower conical section further comprising:
    a hollow cavity positioned outwardly of said alternating layers of tempered rings and non-tempered rings; and
    a rim positioned outwardly of said hollow cavity.

11. The flywheel apparatus of claim 10, said hollow cavity being filled with a fluid.

12. The flywheel apparatus of claim 11, said fluid being selected from a group consisting of water, mercury-based fluids, oil-based fluids, and mixtures thereof.

13. The flywheel apparatus of claim 8, said motor being a brushless DC motor having permanent magnet rotors.

14. A flywheel comprising:
    a hollow core;
    a first conical section extending outwardly of a first side of said hollow core; and
    a second conical section extending outwardly of a second side of said hollow core, each of said first conical section and said second conical section comprising:
    alternating layers of tempered rings and non-tempered rings arranged outwardly of said hollow core, wherein an elastomeric adhesive is used to join said alternating layers;
    a hollow cavity positioned outwardly of said alternating layers of tempered rings and non-tempered rings; and
    a rim positioned outwardly of said hollow cavity.

* * * * *